US012679085B2

(12) United States Patent
Orihara

(10) Patent No.: US 12,679,085 B2
(45) Date of Patent: Jul. 14, 2026

(54) LIQUID EJECTION APPARATUS AND LIQUID EJECTION HEAD

(71) Applicant: SEIKO EPSON CORPORATION, Tokyo (JP)

(72) Inventor: Daichi Orihara, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 185 days.

(21) Appl. No.: 18/786,701

(22) Filed: Jul. 29, 2024

(65) Prior Publication Data

US 2025/0042150 A1 Feb. 6, 2025

(30) Foreign Application Priority Data

Jul. 31, 2023 (JP) ................................ 2023-124373

(51) Int. Cl.
*B41J 2/045* (2006.01)
*B41J 2/14* (2006.01)

(52) U.S. Cl.
CPC ......... *B41J 2/04581* (2013.01); *B41J 2/0455* (2013.01); *B41J 2/04588* (2013.01); *B41J 2/14072* (2013.01)

(58) Field of Classification Search
CPC .. B41J 2/04581; B41J 2/04588; B41J 2/0455; B41J 2/14072; B41J 2/0451; B41J 2/04593; B41J 2/14201; B41J 2/04501; B41J 2/14209; B41J 2/14233; B41J 2/14274; B41J 2/14282; B41J 2/1429; B41J 2/14298; B41J 2002/14217; B41J 2002/14225; B41J 2002/14241; B41J 2002/1425; B41J 2002/14266; B41J 2002/14306
See application file for complete search history.

(56) References Cited

U.S. PATENT DOCUMENTS

2015/0054876 A1 2/2015 Nakazawa et al.
2017/0113458 A1 * 4/2017 Abe ..................... B41J 2/04541
2022/0194077 A1 * 6/2022 Orihara ................ B41J 2/14233

FOREIGN PATENT DOCUMENTS

JP 2015-039856 A 3/2015
JP 2017149153 * 8/2017 ................ B41J 2/01

* cited by examiner

*Primary Examiner* — Kristal Feggins
(74) *Attorney, Agent, or Firm* — Spencer Fane LLP

(57) ABSTRACT

A liquid ejection apparatus includes an ejection portion including a piezoelectric element driven by a drive signal, a first wire to which a first drive signal of the drive signal is supplied, a second wire electrically coupled to an element electrode of the piezoelectric element, and a detection circuit detecting a potential of the element electrode varying according to a vibration remaining in the piezoelectric element after driving of the piezoelectric element, wherein a first amplifier circuit of the detection circuit includes a first amplifier having a first input terminal, a second input terminal, and a first output terminal, a first resistor electrically coupling a first node electrically coupled to the first input terminal and a second node electrically coupled to the first output terminal, and a second resistor electrically coupling the first node and the second wire, and the first wire is electrically coupled to the second input terminal.

18 Claims, 9 Drawing Sheets

| Sd[m] | D[m] | Qa[m] | Qs[m] |
|---|---|---|---|
| 1 | DP | H | L |
| 2 | DH | L | L |
| 3 | DS | L | H |

| TC | SH |
|---|---|
| TC < Tth1 | 2: EJECTION ABNORMALITY (AIR BUBBLES) |
| Tth1 ≦ TC ≦ Tth2 | 1: NORMAL |
| Tth2 < TC ≦ Tth3 | 3: EJECTION ABNORMALITY (FOREIGN MATTER) |
| Tth3 < TC | 4: EJECTION ABNORMALITY (INCREASE IN VISCOSITY) |

LIQUID EJECTION APPARATUS AND LIQUID EJECTION HEAD

The present application is based on, and claims priority from JP Application Serial Number 2023-124373, filed Jul. 31, 2023, the disclosure of which is hereby incorporated by reference herein in its entirety.

BACKGROUND

1. Technical Field

The present disclosure relates to a liquid ejection apparatus and a liquid ejection head.

2. Related Art

A liquid ejection apparatus such as an inkjet printer forms an image on a medium by driving a piezoelectric element provided in an ejection portion provided in a liquid ejection head by a drive signal to eject liquid such as an ink filled in a pressure chamber provided in the ejection portion from a nozzle. However, in the liquid ejection apparatus, the ejection portion may fail to normally eject the liquid, that is, an ejection abnormality may occur. Accordingly, a technique of checking an ejection state in an ejection portion has been proposed. For example, JP-A-2015-039856 discloses a technique of, first, turning on a drive switch for switching continuity and discontinuity between a drive signal supply line to which a drive signal is supplied and a piezoelectric element to drive the piezoelectric element, second, turning on a detection switch for switching continuity and discontinuity between a detection circuit for detecting a potential of the piezoelectric element and the piezoelectric element to detect the potential of the piezoelectric element by the detection circuit, and third, checking an ejection state of an ejection portion based on a detection result by the detection circuit.

JP-A-2015-039856 is an example of the related art.

However, according to the related art, since the detection switch is turned on when the detection circuit detects the potential of the piezoelectric element, switching noise of the detection switch is superimposed on a signal indicating the potential of the piezoelectric element. Therefore, according to the related art, there is a problem that the detection circuit is hard to accurately detect the potential of the piezoelectric element.

SUMMARY

According to an aspect of the present disclosure, a liquid ejection apparatus includes an ejection portion including a piezoelectric element driven by a drive signal, a pressure chamber filled with a liquid and having a volume that changes according to driving of the piezoelectric element, and a nozzle ejecting the liquid in the pressure chamber according to a change of the volume of the pressure chamber, a first wire to which a first drive signal of the drive signal is supplied, a second wire electrically coupled to an element electrode of the piezoelectric element, a detection circuit detecting a potential of the element electrode varying according to a vibration remaining in the piezoelectric element after the driving of the piezoelectric element, and a check device checking an ejection state of the liquid in the ejection portion based on a detection result of the detection circuit, wherein the detection circuit includes a first amplifier circuit, and the first amplifier circuit includes a first amplifier having a first input terminal, a second input terminal, and a first output terminal outputting a signal based on input to the first input terminal and input to the second input terminal, a first resistor electrically coupling a first node electrically coupled to the first input terminal and a second node electrically coupled to the first output terminal, and a second resistor electrically coupling the first node and the second wire, and the first wire is electrically coupled to the second input terminal.

According to an aspect of the present disclosure, a liquid ejection head includes a piezoelectric element driven by a drive signal, a pressure chamber filled with a liquid and having a volume that changes according to driving of the piezoelectric element, a nozzle ejecting the liquid in the pressure chamber according to a change of the volume of the pressure chamber, a first wire to which a first drive signal of the drive signal is supplied, a second wire electrically coupled to an element electrode of the piezoelectric element, and a detection circuit detecting a potential of the element electrode varying according to a vibration remaining in the piezoelectric element after the driving of the piezoelectric element, wherein the detection circuit includes a first amplifier circuit, and the first amplifier circuit includes a first amplifier having a first input terminal, a second input terminal, and a first output terminal outputting a signal based on input to the first input terminal and input to the second input terminal, a coupling first resistor electrically a first node electrically coupled to the first input terminal and a second node electrically coupled to the first output terminal, and a second resistor electrically coupling the first node and the second wire, and the first wire is electrically coupled to the second input terminal.

DESCRIPTION OF EMBODIMENTS

As below, embodiments of the present disclosure will be described with reference to the drawings. In the respective drawings, the dimensions and the scales of the respective parts are appropriately different from the real ones. Further, the following embodiments are preferable specific examples of the present disclosure and various technically preferable limitations are imposed thereon, however, the scope of the present disclosure is not limited to the embodiments unless such limitation is specifically stated in the following description.

A. Embodiment

In the embodiment, a liquid ejection apparatus will be described using an inkjet printer that ejects an ink to form an image on a recording paper PP as an example.

1. Overview of Inkjet Printer

As below, an example of a configuration of an inkjet printer 1 according to the embodiment will be described with reference to FIGS. 1 to 3.

Figure 1:
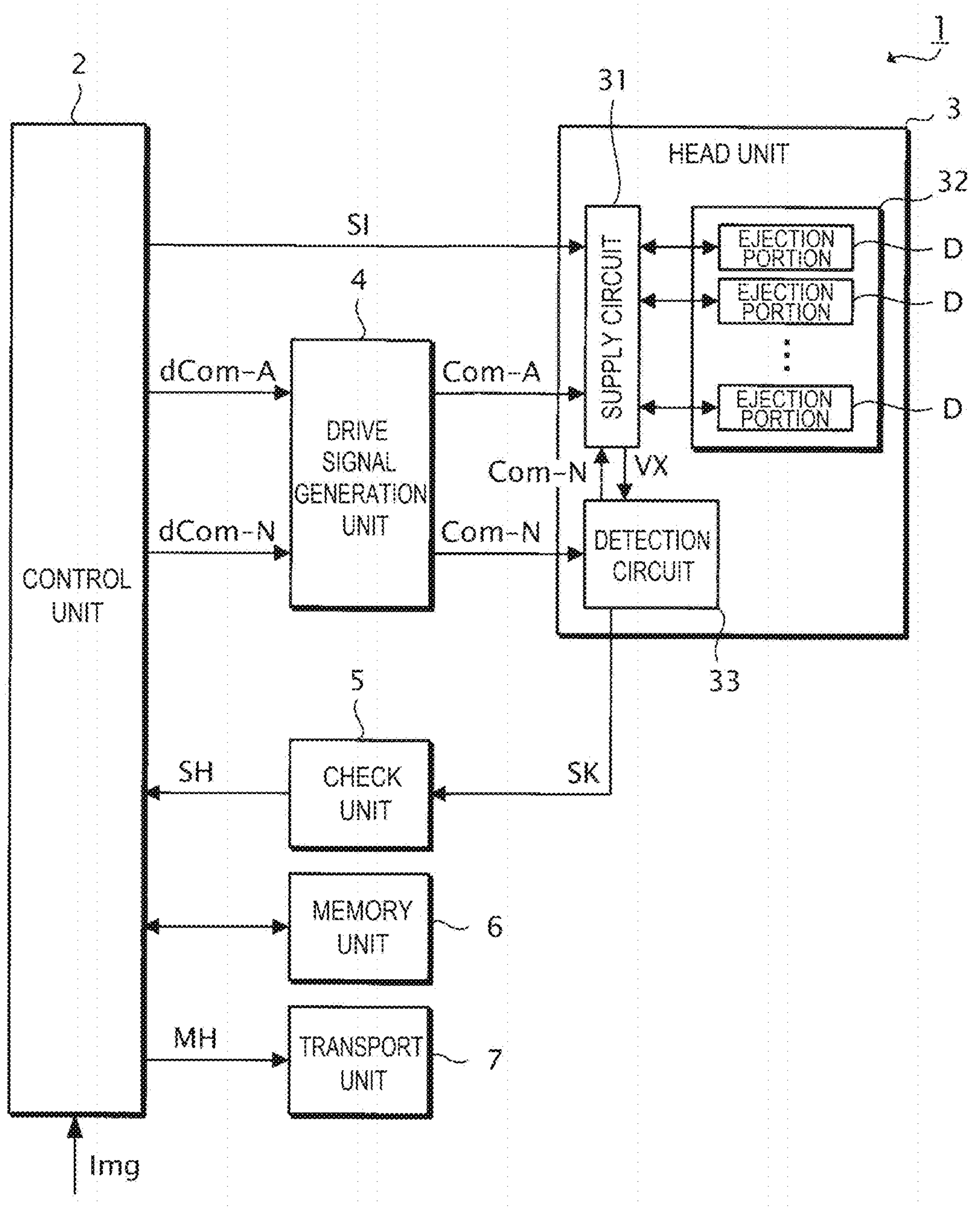
FIG. 1 is a block diagram showing an example of a configuration of an inkjet printer 1 according to an embodiment of the present disclosure.

FIG. 1 is a functional block diagram showing an example of the configuration of the inkjet printer 1.

As shown in FIG. 1, print data Img representing an image to be formed by the inkjet printer 1 is supplied to the inkjet printer 1 from a personal computer or a host computer such as a digital camera. The inkjet printer 1 executes printing processing of forming an image represented by the print data Img supplied from the host computer on recording paper PP.

As shown in FIG. 1, the inkjet printer 1 includes a control unit 2 that controls each section of the inkjet printer 1, a head unit 3 provided with ejection portions D that eject an ink, a drive signal generation unit 4 that generates a drive signal Com for driving the ejection portion D, a check unit 5 that checks the ejection states of the ink in the ejection portions D, a memory unit 6 that stores various types of information, and a transport unit 7 for changing the relative position of the recording paper PP with respect to the head unit 3. The ink is an example of “liquid”, the inkjet printer 1 is an example of a “liquid ejection apparatus”, the head unit 3 is an example of a “liquid ejection head”, and the check unit 5 is an example of a “check device”.

In the embodiment, a case where the inkjet printer 1 includes one or more head units 3, one or more drive signal generation units 4 corresponding to the one or more head units 3 on a one-to-one basis, and one or more check units 5 corresponding to the one or more head units 3 on a one-to-one basis is assumed. Specifically, in the embodiment, a case where the inkjet printer 1 includes four head units 3, four drive signal generation units 4 corresponding to the four head units 3 on a one-to-one basis, and four check units 5 corresponding to the four head units 3 on a one-to-one basis is assumed. However, as below, for convenience of description, as shown in FIG. 1, the explanation will be made with a focus on one head unit 3 of the four head units 3, one drive signal generation unit 4 provided to correspond to the one head unit 3 of the four drive signal generation units 4, and one check unit 5 provided to correspond to the one head unit 3 of the four check units 5.

The control unit 2 includes one or more CPUs (Central Processing Units). However, the control unit 2 may include a programmable logic device such as an FPGA (field-programmable gate array) in place of or in addition to the CPU. The control unit 2 includes a memory. The memory includes one or both of a volatile memory such as a RAM (random access memory) and a nonvolatile memory such as a ROM (read only memory), an EEPROM (electrically erasable programmable read-only memory), or a PROM (programmable ROM).

As will be described in detail below, the control unit 2 generates signals for controlling the operation of each section of the inkjet printer 1 including a designation signal SI and a waveform designation signal dCom.

Here, the waveform designation signal dCom is a digital signal that defines the waveform of the drive signal Com. In the embodiment, a case where the waveform designation signal dCom includes a printing waveform designation signal dCom-A and a check waveform designation signal dCom-N is assumed.

The drive signal Com is an analog signal for driving the ejection portion D. In the embodiment, a case where the drive signal Com includes a printing drive signal Com-A and a check drive signal Com-N is assumed. In the embodiment, the check drive signal Com-N is an example of a “first drive signal”, and the printing drive signal Com-A is an example of a “second drive signal”.

The drive signal generation unit 4 generates the printing drive signal Com-A having a waveform designated by the printing waveform designation signal dCom-A based on the printing waveform designation signal dCom-A. The drive signal generation unit 4 generates the check drive signal Com-N having a waveform designated by the check waveform designation signal dCom-N based on the check waveform designation signal dCom-N.

The designation signal SI is a digital signal that designates the type of operation of the ejection portion D. Specifically, the designation signal SI designates the type of operation of the ejection portion D as to whether an ink is ejected from the ejection portion D by designating whether to supply the drive signal Com to the ejection portion D.

When the printing processing is executed, the control unit 2 generates a signal for controlling the head unit 3 including the designation signal SI based on the print data Img. Further, when the printing processing is executed, the control unit 2 generates a signal for controlling the drive signal generation unit 4 including the printing waveform designation signal dCom-A. Furthermore, when the printing processing is executed, the control unit 2 generates a signal for controlling the transport unit 7. Thereby, in the printing processing, the control unit 2 controls the transport unit 7 to change the relative position of the recording paper PP with respect to the head unit 3, adjusts the ejection of the ink from the ejection portion D, the ejection timing of the ink, and the like, and controls each section of the inkjet printer 1 to form an image corresponding to the print data Img on the recording paper PP.

As shown in FIG. 1, the head unit 3 includes a supply circuit 31, a recording head 32, and a detection circuit 33.

The recording head 32 includes M ejection portions D. Here, the value M is a natural number satisfying “M≥1”. Hereinafter, among the M ejection portions D provided in the recording head 32, the m-th ejection portion D may be referred to as “ejection portion D[m]”. Here, the variable m is a natural number satisfying “1≤m≤M”. Further, hereinafter, when a component element, a signal, or the like of the inkjet printer 1 corresponds to the ejection portion D[m] of the M ejection portions D, a subscript [m] may be added to a sign showing the component element, the signal, or the like.

The supply circuit 31 switches whether to supply the drive signal Com to the ejection portion D[m] based on the designation signal SI. Hereinafter, of the drive signals Com, the drive signal Com supplied to the ejection portion D[m] may be referred to as a supply drive signal Vin[m].

The supply circuit 31 switches whether to supply the detection potential signal VX[m] to the detection circuit 33 based on the designation signal SI. Here, the detection potential signal VX[m] is a signal indicating the potential of an upper electrode Zu[m] provided in a piezoelectric element PZ[m] provided in the ejection portion D[m]. Hereinafter, when the detection potential signal VX[m] is supplied from the ejection portion D[m] to the detection circuit 33, the ejection portion D[m] may be referred to as a check object ejection portion DS. The piezoelectric element PZ[m] and the upper electrode Zu[m] will be described later with reference to FIG. 3.

The detection circuit 33 generates a detection signal SK[m] based on the detection potential signal VX[m] supplied from the ejection portion D[m] as the check object ejection portion DS via the supply circuit 31.

The check unit 5 checks whether the ejection state of the ink in the check object ejection portion DS is normal based on the detection signal SK[m]. In other words, the check unit 5 checks whether an ejection abnormality does not occur in the check object ejection portion DS based on the detection signal SK[m]. Then, the check unit 5 generates check result information SH[m] indicating a result of the check. Here, the check result information SH[m] is information indicating whether an ejection abnormality occurs in the ejection portion D[m] selected as the check object ejection portion DS. Further, the ejection abnormality is a generic term of a state in which a nozzle N[m] provided in the ejection portion D[m] fails to normally eject the ink. For example, the ejection abnormality includes a state in which the ejection portion D[m] fails to eject the ink, a state in which the ejection portion D[m] ejects the ink in an amount different from the ejection amount of the ink defined by the drive signal Com, and a state in which the ejection portion D[m] ejects the ink at a speed different from the ejection speed of the ink defined by the drive signal Com.

Hereinafter, processing of checking the ejection state of the ink in the ejection portion D[m] by driving the ejection portion D[m] as the check object ejection portion DS is referred to as ejection state check processing. Further, hereinafter, processing of driving the ejection portion D[m] as the check object ejection portion DS in the ejection state check processing is referred to as check object drive processing.

Hereinafter, of the ejection state check processing, processing of detecting the detection potential signal VX[m] from the ejection portion D[m] driven as the check object ejection portion DS is referred to as residual vibration detection processing.

When the check object drive processing is executed, the control unit 2 generates a signal for controlling the head unit 3 including the designation signal SI. Further, when the check object drive processing is executed, the control unit 2 generates a for controlling the drive signal generation unit 4 including the detection waveform designation signal dCom-N. Thereby, the control unit 2 drives the ejection portion D[m] as the check object ejection portion DS in the check object drive processing.

When the residual vibration detection processing is executed, the control unit 2 generates the designation signal SI and controls the head unit 3 to supply the detection potential signal VX[m] corresponding to the ejection portion D[m] driven as the check object ejection portion DS to the detection circuit 33. Further, when the residual vibration detection processing is executed, the detection circuit 33 generates the detection signal SK[m] based on the detection potential signal VX[m] detected from the ejection portion D[m] driven as the check object ejection portion DS.

Figure 2:
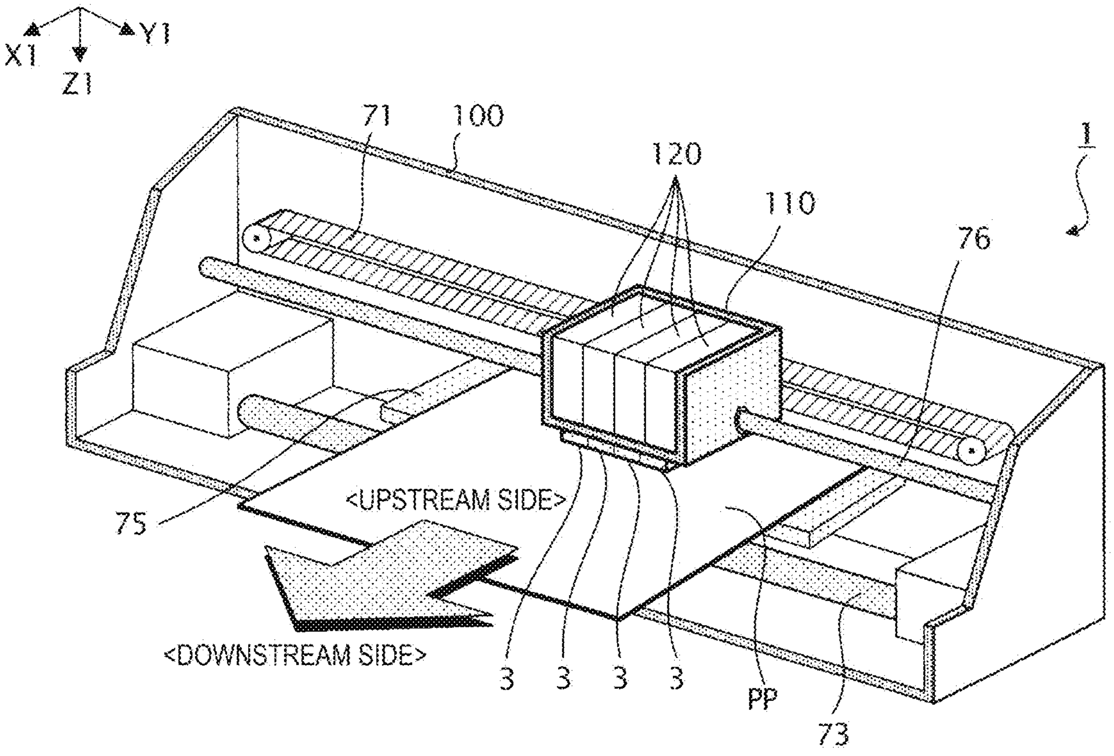
FIG. 2 is a perspective view showing an example of a schematic internal structure of the inkjet printer 1.

FIG. 2 is a perspective view showing an example of a schematic internal structure of the inkjet printer 1.

As shown in FIG. 2, in the embodiment, a case where the inkjet printer 1 is a serial printer is assumed. Specifically, when executing the printing processing, the inkjet printer 1 forms dots Dt according to the print data Img on the recording paper PP by ejecting the ink from the ejection portions D[m] while transporting the recording paper PP in an X1 direction and reciprocating the head unit 3 in a Y1 direction intersecting the X1 direction and a Y2 direction opposite to the Y1 direction.

Hereinafter, the X1 direction and an X2 direction opposite thereto are collectively referred to as "X-axis direction", the Y1 direction intersecting the X-axis direction and the Y2 direction opposite thereto are collectively referred to as "Y-axis direction", and a Z1 direction intersecting the X-axis direction and the Y-axis direction and a Z2 direction opposite thereto are collectively referred to as "Z-axis direction". In the embodiment, a case where the X-axis direction, the Y-axis direction, and the Z-axis direction are orthogonal to one other will be described as an example. However, the present disclosure is not limited to the configuration. It is only necessary that the X-axis direction, the Y-axis direction, and the Z-axis direction intersect one another. In the embodiment, the Z1 direction is a direction in which the ink is ejected from the ejection portion D[m].

As shown in FIG. 2, the inkjet printer 1 according to the embodiment includes a housing 100 and a carriage 110 that can reciprocate in the Y axis direction within the housing 100 with the four head units 3 mounted thereon.

In the embodiment, as shown in FIG. 2, a case where the carriage 110 holds four ink cartridges 120 corresponding to inks in four colors of cyan, magenta, yellow, and black on a one-to-one basis is assumed. In the embodiment, as described above, a case where the inkjet printer 1 includes the four head units 3 corresponding to the four ink cartridges 120 on a one-to-one basis is assumed. Each ejection portion D[m] is supplied with the ink from the ink cartridge 120 corresponding to the head unit 3 provided with the ejection portion D[m]. Accordingly, each ejection portion D[m] may be filled with the supplied ink and eject the ink filled in the ejection portion D[m] from the nozzle N[m] provided in the ejection portion D[m]. The ink cartridge 120 may be provided outside the carriage 110.

As described above, the inkjet printer 1 according to the embodiment includes the transport unit 7. As shown in FIG. 2, the transport unit 7 includes a carriage transport mechanism 71 for reciprocating the carriage 110 in the Y-axis direction, a carriage guide shaft 76 for supporting the carriage 110 to reciprocate in the Y-axis direction, a medium transport mechanism 73 for transporting the recording paper PP, and a platen 75 provided in the Z1 direction of the carriage 110. Accordingly, when the printing processing is executed, the transport unit 7 controls the carriage transport mechanism 71 to reciprocate the head units 3 in the Y-axis direction along the carriage guide shaft 76 together with the carriage 110 and controls the medium transport mechanism 73 to transport the recording paper PP on the platen 75 in the X1 direction to change the relative position of the recording paper PP with respect to the head units 3, and thereby, enables landing of the ink over the entire of the recording paper PP.

Figure 3:
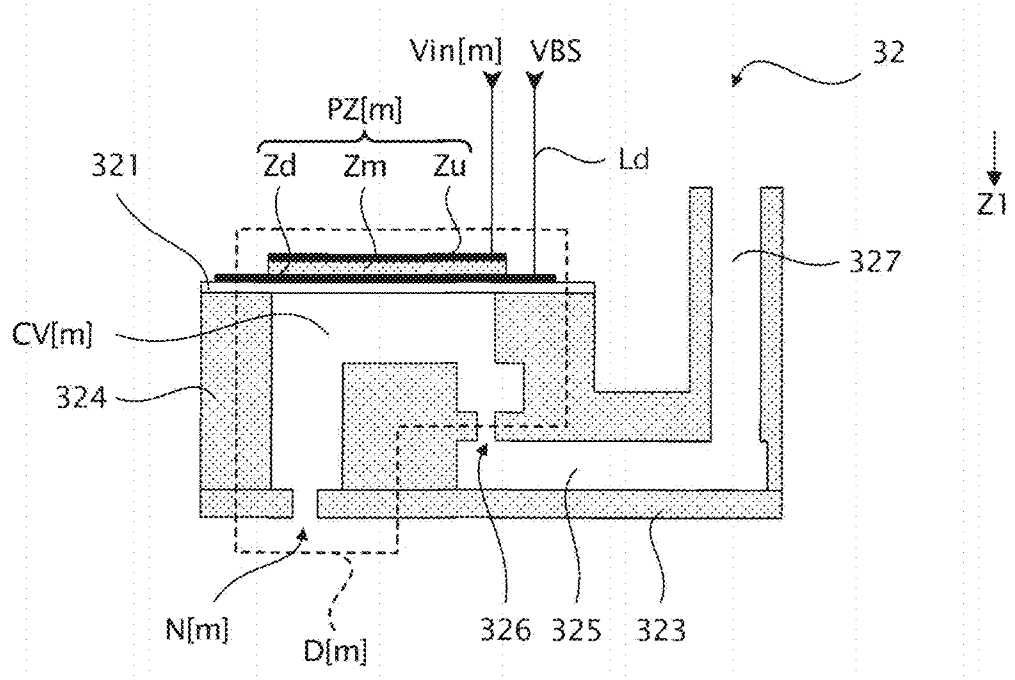
FIG. 3 is a cross-sectional view for explanation of an example of a structure of an ejection portion D[m].

FIG. 3 is a schematic partial cross-sectional view of the recording head 32 when the recording head 32 is cut to include the ejection portion D[m].

As shown in FIG. 3, the ejection portion D[m] includes the piezoelectric element PZ[m], a cavity CV[m] filled with the ink, the nozzle N[m] communicating with the cavity CV[m], and a vibrating plate 321. The ejection portion D[m] ejects the ink in the cavity CV[m] from the nozzle N[m] by the piezoelectric element PZ[m] being driven by the supply drive signal Vin[m]. The cavity CV[m] is a space defined by a cavity plate 324, a nozzle plate 323 in which the nozzle N[m] is formed, and the vibrating plate 321. The cavity CV[m] communicates with a reservoir 325 via an ink supply port 326. The reservoir 325 communicates with the ink cartridge 120 corresponding to the ejection portion D[m] via an ink intake port 327. The piezoelectric element PZ[m] includes the upper electrode Zu[m], a lower electrode Zd[m], and a piezoelectric body Zm[m] provided between the upper electrode Zu[m] and the lower electrode Zd[m]. The lower electrode Zd[m] is electrically coupled to a feed line Ld set at a predetermined potential VBS. When the supply drive signal Vin[m] is supplied to the upper electrode Zu[m] and a voltage is applied between the upper electrode Zu[m] and the lower electrode Zd[m], the piezoelectric element PZ[m] is displaced in the Z1 direction or the Z2 direction according to the applied voltage, and as a result, the piezoelectric element PZ[m] vibrates. The lower electrode Zd[m] is bonded to the vibrating plate 321. Therefore, when the piezoelectric element PZ[m] is driven by the supply drive signal Vin[m] and vibrates, the vibrating plate 321 also vibrates. Then, the volume of the cavity CV[m] and the pressure in the cavity CV[m] change due to the vibration of the vibrating plate 321, and the ink filled in the cavity CV[m] is ejected from the nozzle N[m].

In the embodiment, the cavity CV[m] is an example of a "pressure chamber".

2. Overview of Head Unit

As below, an overview of the head unit 3 will be described with reference to FIGS. 4 to 6.

Figure 4:
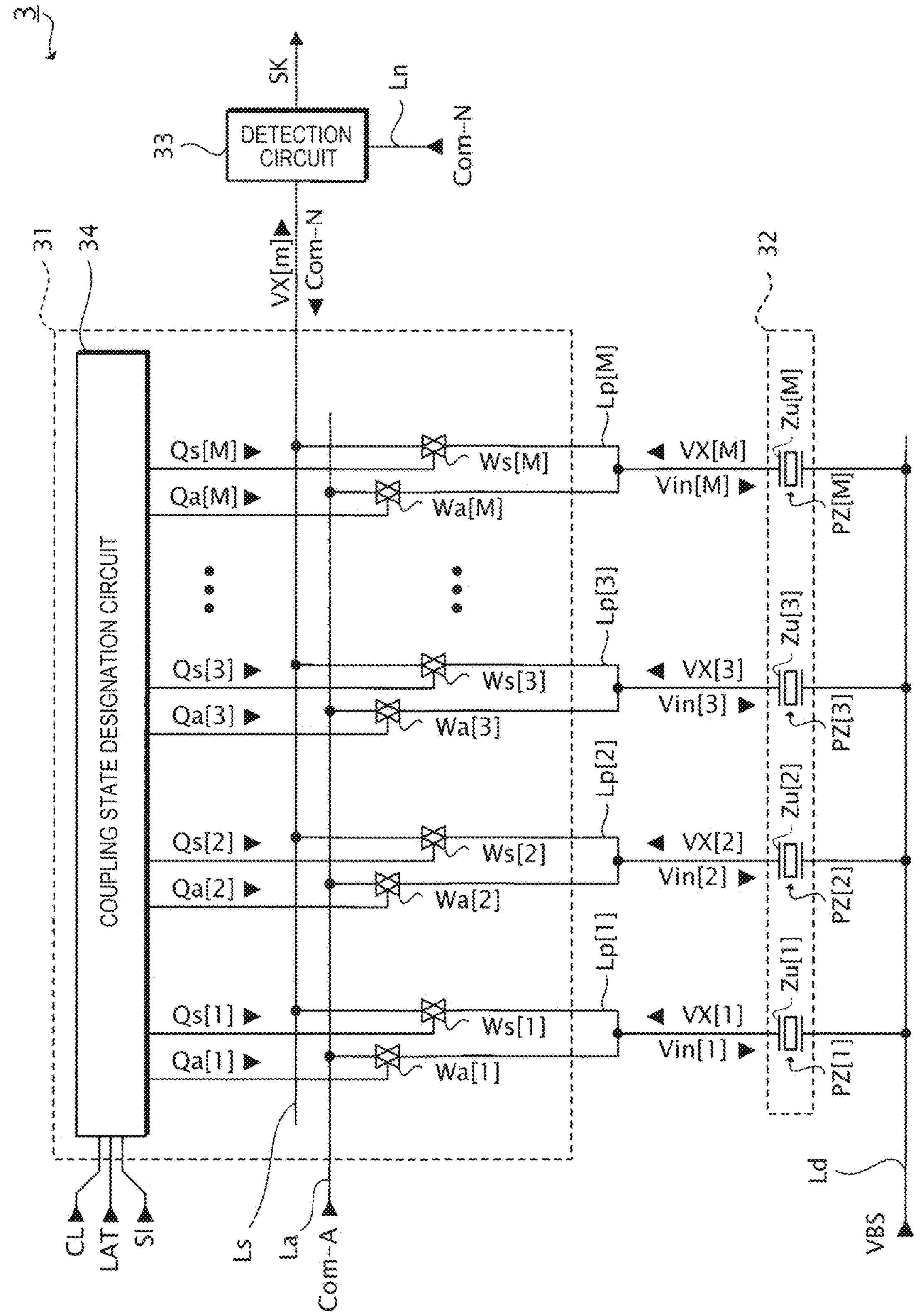
FIG. 4 is a block diagram showing an example of a configuration of a head unit 3.

FIG. 4 is a block diagram showing an example of the configuration of the head unit 3.

As shown in FIG. 4, the head unit 3 includes the supply circuit 31, the recording head 32, and the detection circuit 33. Further, the head unit 3 includes a wire La to which the printing drive signal Com-A is supplied from the drive signal generation unit 4, a wire Ln to which the check drive signal Com-N is supplied from the drive signal generation unit 4, and a wire Ls for supplying the detection potential signal VX[m] to the detection circuit 33. Furthermore, the head unit 3 includes M wires Lp[1] to Lp[M] corresponding to the M ejection portions D[1] to D[M] on a one-to-one basis. Of the wires, the wire Lp[m] is electrically coupled to the upper electrode Zu[m] of the piezoelectric element PZ[m] provided in the ejection portion D[m].

In the embodiment, the wire Ln is an example of a "first line", the wire Lp[m] is an example of a "second line", the wire La is an example of a "third line", and the upper electrode Zu[m] is an example of an "element electrode".

The detection circuit 33 generates the detection signal SK[m] by amplification of the detection potential signal VX[m] based on the detection potential signal VX[m] supplied from the wire Ls. The detection circuit 33 amplifies the check drive signal Com-N supplied from the wire Ln and outputs the amplified check drive signal Com-N to the wire Ls. Hereinafter, for convenience of description, the amplified check drive signal Com-N output by the detection circuit 33 is simply referred to as a check drive signal Com-N.

The supply circuit 31 includes M switches Wa[1] to Wa[M] corresponding to the M ejection portions D[1] to D[M] on a one-to-one basis, M switches Ws[1] to Ws[M] corresponding to the M ejection portions D[1] to D[M] on a one-to-one basis, and a coupling state designation circuit 34 for designating coupling states of the respective switches.

The coupling state designation circuit 34 generates a coupling state designation signal Qa[m] for designating ON/OFF of the switch Wa[m] and a coupling state designation signal Qs[m] for designating ON/OFF of the switch Ws[m] based on the designation signal SI and a latch signal LAT supplied from the control unit 2.

The switch Wa[m] switches between continuity and discontinuity between the wire La and the wire Lp[m] electrically coupled to the upper electrode Zu[m] of the piezoelectric element PZ[m] based on the coupling state designation signal Qa[m]. In the embodiment, the switch Wa[m] is turned on when the coupling state designation signal Qa[m] is at a high level, and turned off when the signal is at a low level. When the switch Wa[m] is turned on, the printing drive signal Com-A supplied to the wire La is supplied to the upper electrode Zu[m] of the ejection portion D[m] as the supply drive signal Vin[m].

The switch Ws[m] switches between continuity and discontinuity between the wire Ls and the wire Lp[m] electrically coupled to the upper electrode Zu[m] of the piezoelectric element PZ[m] based on the coupling state designation signal Qs[m]. In the embodiment, the switch Ws[m] is turned on when the coupling state designation signal Qs[m] is at the high level, and turned off when the signal is at the low level. When the switch Ws[m] is turned on, the potential of the upper electrode Zu[m] provided in the ejection portion D[m] is supplied as the detection potential signal VX[m] to the detection circuit 33 via the wire Lp[m] and the wire Ls. When the switch Ws[m] is turned on, the check drive signal Com-N supplied to the wire Ls is supplied as the supply drive signal Vin[m] to the upper electrode Zu[m] of the ejection portion D[m] via the wire Lp[m].

In the embodiment, the switch Ws[m] is an example of a "first switch", and the switch Wa[m] is an example of a "second switch".

When the inkjet printer 1 executes the printing processing or the ejection state check processing, a plurality of unit periods TP are set as operating periods of the inkjet printer 1. The inkjet printer 1 can drive each ejection portion D for the printing processing or ejection state check processing in each unit period TP.

Figures 5, 6:
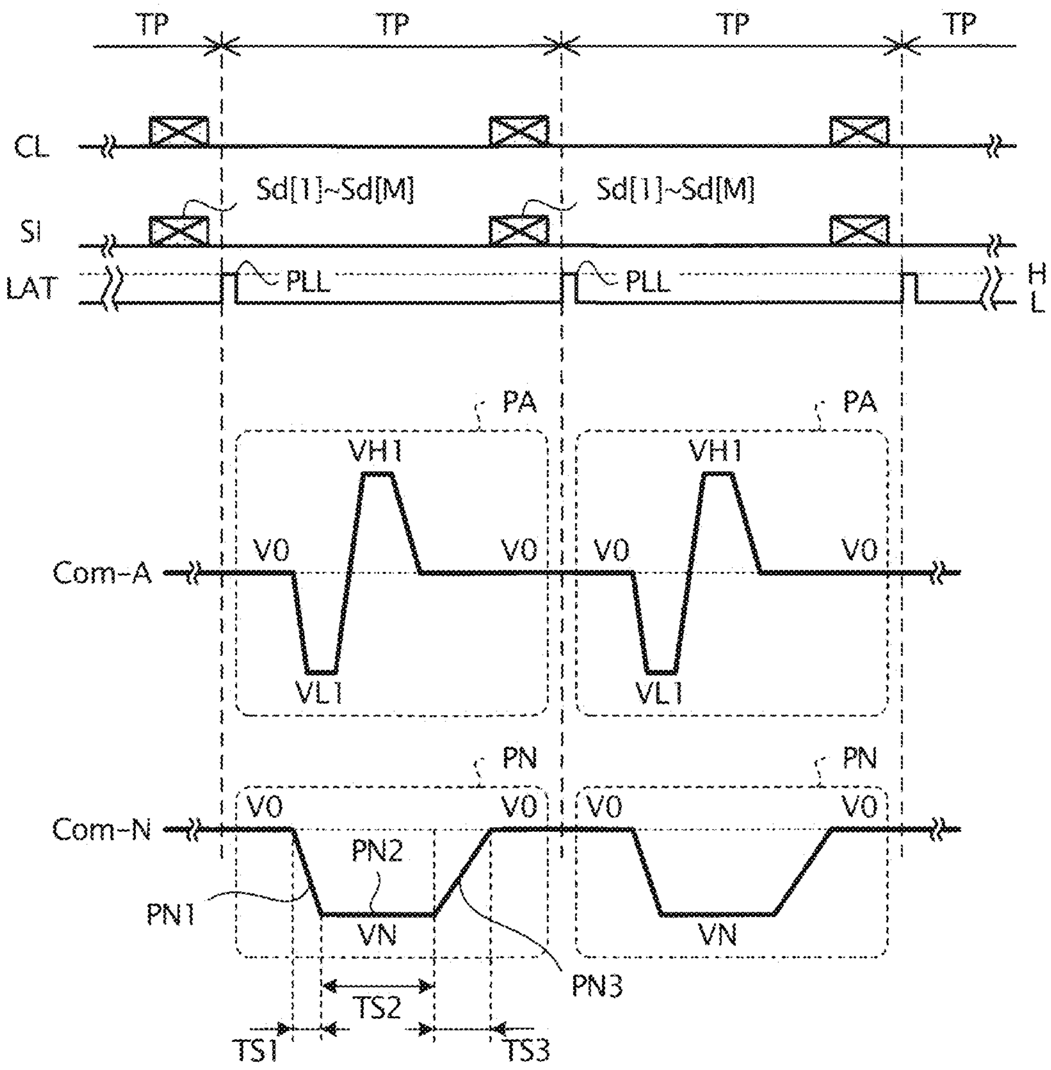
FIG. 5 is a timing chart for explanation of examples of signals supplied to the head unit 3.
FIG. 6 is an explanatory diagram for explanation of an example of an operation of a coupling state designation circuit 34.

FIG. 5 is a timing chart showing an example of various signals including the drive signal Com supplied to the head unit 3 in the plurality of unit periods TP.

As shown in FIG. 5, the control unit 2 outputs the latch signal LAT having a plurality of pulses PLL. Thereby, the control unit 2 defines the unit period TP as a period from the rise of the pulse PLL to the rise of the next pulse PLL.

As shown in FIG. 5, the designation signal SI includes M individual designation signals Sd[1] to Sd[M] corresponding to the M ejection portions D[1] to D[M] on a one-to-one basis. The individual designation signal Sd[m] designates a drive mode of the ejection portion D[m] in each unit period TP when the inkjet printer 1 executes the printing processing or the ejection state check processing. Prior to each unit period TP, the control unit 2 supplies the designation signal SI containing the M individual designation signals Sd[1] to Sd[M] to the coupling state designation circuit 34 in synchronization with a clock signal CL. In the unit period TP, the coupling state designation circuit 34 generates the coupling state designation signal Qa[m] and the coupling state designation signal Qs[m] based on the individual designation signal Sd[m].

In the embodiment, the individual designation signal Sd[m] can take any one of three values of a value "1" designating the ejection portion D[m] as a print ejection portion DP, a value "2" designating the ejection portion D[m] as a dot non-forming ejection portion DH, and a value "3" designating the ejection portion D[m] as the check object ejection portion DS in the unit period TP in which the printing processing or the ejection state check processing is performed.

Here, the print ejection portion DP is the ejection portion D that ejects the ink from the nozzle N[m] in the unit period TP to form the dot Dt on the recording paper PP. The dot non-forming ejection portion DH is the ejection portion D that does not eject the ink from the nozzle N[m] in the unit period TP and does not form the dot Dt on the recording paper PP. As described above, the check object ejection portion DS is the ejection portion D as the object of the ejection state check processing in the unit period TP.

As shown in FIG. 5, the printing drive signal Com-A has a waveform PA provided in each unit period TP. Here, the waveform PA is a waveform that returns from a reference potential V0 to the reference potential V0 through a potential VL1 lower than the reference potential V0 and a potential VH1 higher than the reference potential V0 in each unit period TP. When the supply drive signal Vin[m] having the waveform PA is supplied to the ejection portion D[m], the waveform PA is determined such that the ink corresponding to the dot Dt is ejected from the ejection portion D[m].

In the embodiment, as an example, a case where, when the potential of the supply drive signal Vin[m] supplied to the ejection portion D[m] is a high potential, the volume of the cavity CV provided in the ejection portion D[m] is smaller than that when the potential is a low potential is assumed. Therefore, when the ejection portion D[m] is driven by the supply drive signal Vin[m] having the waveform PA, the potential of the supply drive signal Vin[m] changes from the low potential to the high potential, and thereby, the ink in the ejection portion D[m] is ejected from the nozzle N[m].

As shown in FIG. 5, the check drive signal Com-N has a waveform PN provided in each unit period TP. Here, the waveform PN includes an element PN1, an element PN2, and an element PN3, and returns from the reference potential V0 to the reference potential V0 through a potential VN lower than the reference potential V0. Of the elements, the element PN1 is an element of the waveform PN provided in a period TS1 of the unit period TP and having a potential changing from the reference potential V0 to the potential VN lower than the reference potential V0. The element PN2 is an element of the waveform PN provided in a period TS2 subsequent to the period TS1 in the unit period TP and having a potential maintained at the potential VN. The element PN3 is an element of the waveform PN provided in a period TS3 subsequent to the period TS2 in the unit period TP and having a potential changing from the potential VN to the reference potential V0.

In the embodiment, the waveform PN is determined such that the ink is not ejected from the ejection portion D[m] even when the ejection portion D[m] is driven by the check drive signal Com-N.

Hereinafter, a signal of a portion corresponding to the element PN1 of the check drive signal Com-N may be referred to as a check drive signal Com-N1. Here, the check drive signal Com-N1 is an example of a "first check signal", the element PN1 is an example of a "first check waveform", and the period TS1 is an example of a "first check period".

Further, hereinafter, a signal of a portion corresponding to the element PN2 of the check drive signal Com-N may be referred to as a check drive signal Com-N2. Here, the check drive signal Com-N2 is an example of a "second check signal", the potential VN is an example of "detection potential", and the period TS2 is an example of a "second check period".

FIG. 6 is an explanatory diagram showing an example of the operation of the coupling state designation circuit 34.

As shown in FIG. 6, when the individual designation signal Sd[m] indicates the value "1" that designates the ejection portion D[m] as the print ejection portion DP in the unit period TP, the coupling state designation circuit 34 sets the coupling state designation signal Qa[m] at the high level over the unit period TP. In this case, the switch Wa[m] is turned on for the unit period TP. Accordingly, the ejection portion D[m] is driven by the supply drive signal Vin[m] having the waveform PA in the unit period TP, and ejects an amount of the ink corresponding to the dot Dt.

When the individual designation signal Sd[m] indicates the value "2" that designates the ejection portion D[m] as the dot non-forming ejection portion DH in the unit period TP, the coupling state designation circuit 34 sets the coupling state designation signal Qa[m] and the coupling state designation signal Qs[m] at the low level over the unit period TP. In this case, the switch Wa[m] and the switch Ws[m] are turned off for the unit period TP. Accordingly, the ejection portion D[m] is not driven by the supply drive signal Vin[m] in the unit period TP, and does not eject the ink.

When the individual designation signal Sd[m] indicates the value "3" that designates the ejection portion D[m] as the check object ejection portion DS in the unit period TP, the coupling state designation circuit 34 sets the coupling state designation signal Qs[m] at the high level over the unit period TP. In this case, the switch Ws[m] is turned on for the unit period TP. Accordingly, the ejection portion D[m] is driven as the check object ejection portion DS by the supply drive signal Vin[m] having the waveform PN in the unit period TP.

When the ejection portion D[m] is driven as the check object ejection portion DS, the check drive signal Com-N supplied to the ejection portion D[m] in the period TS1 is the check drive signal Com-N1 having the element PN1 that changes from the reference potential V0 to the potential VN. Accordingly, in the period TS1, the ejection portion D[m] is driven by the check drive signal Com-N1 having the element PN1 and vibrates.

When the ejection portion D[m] is driven as the check object ejection portion DS, the check drive signal Com-N supplied to the ejection portion D[m] in the period TS2 is the check drive signal Com-N2 having the element PN2 that maintains the constant potential VN. Accordingly, the potential of the upper electrode Zu[m] detected by the detection circuit 33 as the detection potential signal VX[m] via the switch Ws[m] in the period TS2 indicates a waveform of the vibration remaining in the ejection portion D[m] in the period TS2. The waveform of the detection signal SK[m] generated based on the detection potential signal VX[m] detected from the ejection portion D[m] in the period TS2 indicates the waveform of the vibration remaining in the ejection portion D[m] in the period TS2.

When the ejection portion D[m] is driven as the check object ejection portion DS, the unit period TP in which the ejection portion D[m] is driven as the check object ejection portion DS may be referred to as "check period". When the ejection portion D[m] is driven as the print ejection portion DP, the unit period TP in which the ejection portion D[m] is driven as the print ejection portion DP may be referred to as "print period".

3. Check Unit

As below, an overview of the check unit 5 will be described with reference to FIGS. 7 and 8.

As described above, the check unit 5 checks the ejection state of the ink in the ejection portion D[m] designated as the check object ejection portion DS based on the detection signal SK[m] supplied from the detection circuit 33.

Figures 7, 8:
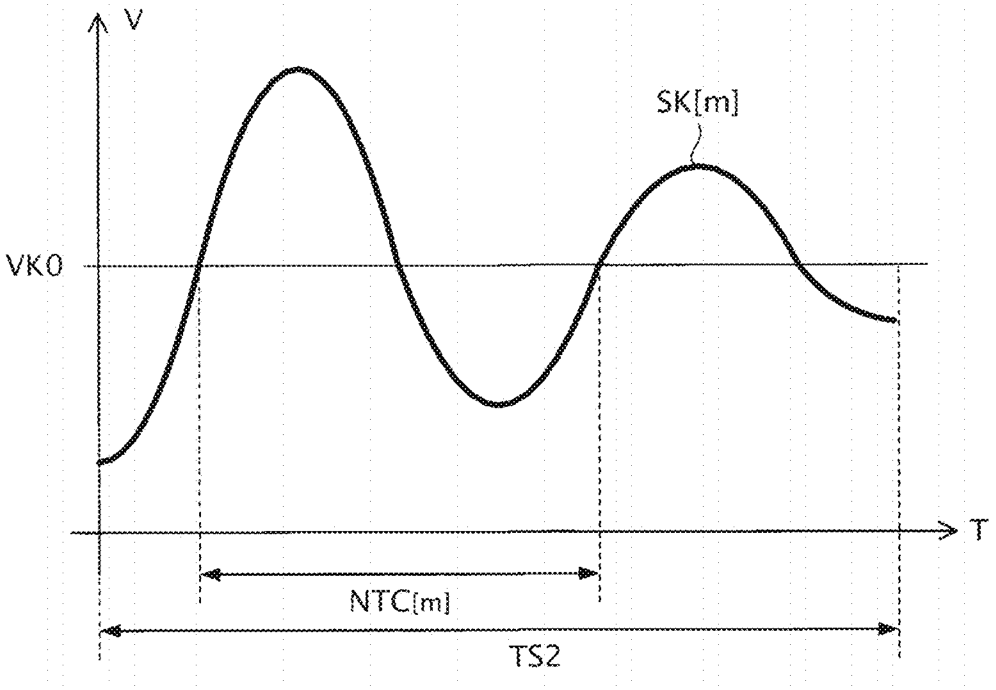
FIG. 7 is a timing chart for explanation of an example of a detection signal SK[m].
FIG. 8 is an explanatory diagram for explanation of an example of an operation of a check unit 5.

FIG. 7 is a timing chart for explanation of an example of the detection signal SK[m] supplied to the check unit 5 by the detection circuit 33. The detection signal SK[m] output by the detection circuit 33 in the period TS2 indicates a waveform based on the vibration remaining in the ejection portion D[m] in the period TS2.

As shown in FIG. 7, hereinafter, a period from a timing when the potential of the detection signal SK[m] coincides with a center potential VK0 set around the amplitude center of the detection signal SK[m] to the next timing when the potential coincides with the center potential VK0 is referred to as a cycle period NTC[m]. Further, hereinafter, a time length of the cycle period NTC[m] is referred to as a cycle TC[m].

In the embodiment, the check unit 5 measures the cycle TC[m] of the detection signal SK[m]. Then, the check unit 5 checks the ejection state of the ink in the ejection portion D[m] based on the cycle TC[m], and generates check result information SH[m] indicating the result of the check.

FIG. 8 is an explanatory diagram for explanation of an example of generation of the check result information SH[m] in the check unit 5.

As shown in FIG. 8, the check unit 5 compares the cycle TC[m] with part or all of a threshold Tth1, a threshold Tth2, and a threshold Tth3 to check the ejection state of the ink in the ejection portion D[m], and generates check result information SH[m] indicating the result of the check.

The threshold Tth1 is a fixed value for indicating a boundary between the cycle TC[m] of the residual vibration generated in the ejection portion D[m] when the ejection state of the ejection portion D[m] is normal and the cycle TC[m] of the residual vibration generated in the ejection portion D[m] when air bubbles are mixed in the cavity CV[m] of the ejection portion D[m].

The threshold value Tth2 is a value larger than the threshold value Tth1, and is a fixed value for indicating a boundary between the cycle TC[m] of the residual vibration generated in the ejection portion D[m] when the ejection state of the ejection portion D[m] is normal and the cycle TC[m] of the residual vibration generated in the ejection portion D[m] when foreign matter adheres to the vicinity of the nozzle N[m] of the ejection portion D[m].

The threshold value Tth3 is a value larger than the threshold value Tth2, and is a fixed value for indicating boundary between the cycle TC[m] of the residual vibration generated in the ejection portion D[m] when foreign matter adheres to the vicinity of the nozzle N[m] of the ejection portion D[m] and the cycle TC[m] of the residual vibration generated in the ejection portion D[m] when the ink in the cavity CV[m] of the ejection portion D[m] increases in viscosity.

In the embodiment, when the cycle TC[m] satisfies "Tth1≤TC[m]≤Tth2", the check unit 5 determines that the ejection state of the ink in the ejection portion D[m] is normal, and sets a value "1" indicating that the ejection state of the ink in the ejection portion D[m] is normal for the check result information SH[m].

When the cycle TC[m] satisfies "TC[m]<Tth1", the check unit 5 determines that an ejection abnormality due to the air bubbles occurs in the ejection portion D[m], and sets a value "2" indicating that the ejection abnormality due to the air bubbles occurs in the ejection portion D[m] for the check result information SH[m].

When the cycle TC[m] satisfies "Tth2<TC[m]≤Tth3", the check unit 5 determines that an ejection abnormality due to the adhesion of foreign matter occurs in the ejection portion D[m], and sets a value "3" indicating that the ejection abnormality due to the adhesion of foreign matter occurs in the ejection portion D[m] for the check result information SH[m].

When the cycle TC[m] satisfies "Tth3<TC[m]", the check unit 5 determines that an ejection abnormality due to the increase in viscosity occurs in the ejection portion D[m], and sets a value "4" indicating that the ejection abnormality due to the increase in viscosity occurs in the ejection portion D[m] for the check result information SH[m].

4. Check Unit

As below, an overview of the detection circuit 33 will be described with reference to FIGS. 9 to 12.

Figure 9:
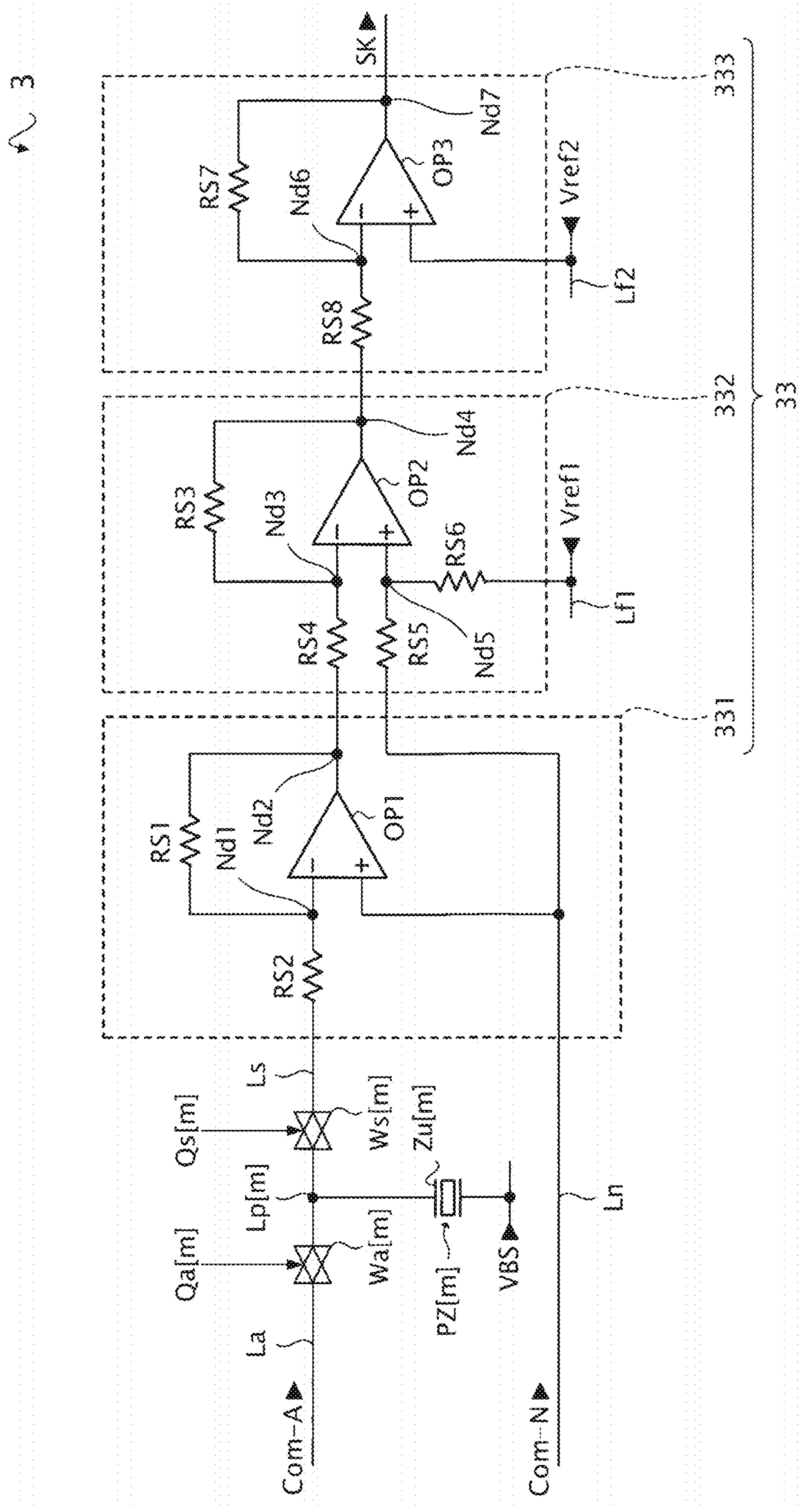
FIG. 9 is a block diagram showing an example of a configuration of a detection circuit 33.

FIG. 9 is a circuit diagram showing an example of a configuration of the detection circuit 33.

As shown in FIG. 9, the detection circuit 33 includes an amplifier circuit 331, a subtraction circuit 332, and an amplifier circuit 333. The amplifier circuit 331 is an example of a "first amplifier circuit", and the amplifier circuit 333 is an example of a "second amplifier circuit".

As shown in FIG. 9, the amplifier circuit 331 includes an operational amplifier OP1, a resistor RS1, a resistor RS2, a node Nd1, and a node Nd2.

The operational amplifier OP1 includes an inverting input terminal (−) electrically coupled to the node Nd1, a non-inverting input terminal (+) electrically coupled to the wire Ln, and an output terminal electrically coupled to the node Nd2. A signal having a potential determined based on a potential of a signal input to the inverting input terminal of the operational amplifier OP1 and a potential of a signal input to the non-inverting input terminal of the operational amplifier OP1 is output from the output terminal of the operational amplifier OP1.

The resistor RS1 has one end electrically coupled to the node Nd1 and the other end electrically coupled to the node Nd2.

The resistor RS2 has one end electrically coupled to the wire Ls via the switch Ws[m] and the other end electrically coupled to the node Nd1.

As described above, in the embodiment, the amplifier circuit 331 includes no switch element except for various elements provided inside the operational amplifier OP1.

In the embodiment, the operational amplifier OP1 is an example of a "first amplifier", the inverting input terminal of the operational amplifier OP1 is an example of a "first input terminal", the non-inverting input terminal of the operational amplifier OP1 is an example of a "second input terminal", and the output terminal of the operational amplifier OP1 is an example of a "first output terminal". In the embodiment, the resistor RS1 is an example of a "first resistor", the resistor RS2 is an example of a "second resistor", the node Nd1 is an example of a "first node", the node Nd2 is an example of a "second node", the node Nd3 is an example of a "third node", the node Nd4 is an example of a "fourth node", and the node Nd5 is an example of a "fifth node".

As shown in FIG. 9, the subtraction circuit 332 includes an operational amplifier OP2, a resistor RS3, a resistor RS4, a resistor RS5, a resistor RS6, a node Nd3, a node Nd4, and a node Nd5.

The operational amplifier OP2 includes an inverting input terminal (−) electrically coupled to the node Nd3, a non-inverting input terminal (+) electrically coupled to the node Nd5, and an output terminal electrically coupled to the node Nd4. A signal having a potential determined based on a potential of a signal input to the inverting input terminal of the operational amplifier OP2 and a potential of a signal input to the non-inverting input terminal of the operational amplifier OP2 is output from the output terminal of the operational amplifier OP2.

The resistor RS3 has one end electrically coupled to the node Nd3 and the other end electrically coupled to the node Nd4.

The resistor RS4 has one end electrically coupled to the node Nd2 and the other end electrically coupled to the node Nd3.

The resistor RS5 has one end electrically coupled to the node Nd5 and the other end electrically coupled to the wire Ln.

The resistor RS6 has one end electrically coupled to the node Nd5 and the other end electrically coupled to a feed line Lf1 set at a predetermined reference potential Vref1.

As described above, in the embodiment, the subtraction circuit 332 is configured including no switch element except for various elements provided inside the operational amplifier OP2.

In the embodiment, the operational amplifier OP2 is an example of a "second amplifier", the inverting input terminal of the operational amplifier OP2 is an example of a "third input terminal", the non-inverting input terminal of the operational amplifier OP2 is an example of a "fourth input terminal", and the output terminal of the operational amplifier OP2 is an example of a "second output terminal". In the embodiment, the resistor RS3 is an example of a "third resistor", the resistor RS4 is an example of a "fourth resistor", the resistor RS5 is an example of a "fifth resistor", and the resistor RS6 is an example of a "sixth resistor". In the embodiment, the node Nd3 is an example of a "third node", the node Nd4 is an example of a "fourth node", and the node Nd5 is an example of a "fifth node". In the embodiment, the feed line Lf1 is an example of a "first feed line", and the reference potential Vref1 is an example of "first reference potential".

As shown in FIG. 9, the amplifier circuit 333 includes an operational amplifier OP3, a resistor RS7, a resistor RS8, a node Nd6, and a node Nd7.

The operational amplifier OP3 includes an inverting input terminal (−) electrically coupled to the node Nd6, a non-inverting input terminal (+) electrically coupled to a feed line Lf2 set at a predetermined reference potential Vref2, and an output terminal electrically coupled to the node Nd7. A signal having a potential determined based on a potential of a signal input to the inverting input terminal of the operational amplifier OP3 and a potential of a signal input to the non-inverting input terminal of the operational amplifier OP3 is output from the output terminal of the operational amplifier OP3.

The resistor RS7 has one end electrically coupled to the node Nd6 and the other end electrically coupled to the node Nd7.

The resistor RS8 has one end electrically coupled to the node Nd4 and the other end electrically coupled to the node Nd6.

As described above, in the embodiment, the amplifier circuit 333 includes no switch element except for various elements provided inside the operational amplifier OP3.

In the embodiment, the operational amplifier OP3 is an example of a "third amplifier", the inverting input terminal of the operational amplifier OP3 is an example of a "fifth input terminal", the non-inverting input terminal of the operational amplifier OP3 is an example of a "sixth input terminal", and the output terminal of the operational amplifier OP3 is an example of a "third output terminal". In the embodiment, the resistor RS7 is an example of a "seventh resistor", the resistor RS8 is an example of an "eighth resistor", the node Nd6 is an example of a "sixth node", and the node Nd7 is an example of a "seventh node". In the embodiment, the feed line Lf2 is an example of a "second feed line", and the reference potential Vref2 is an example of "second reference potential".

Figure 10:
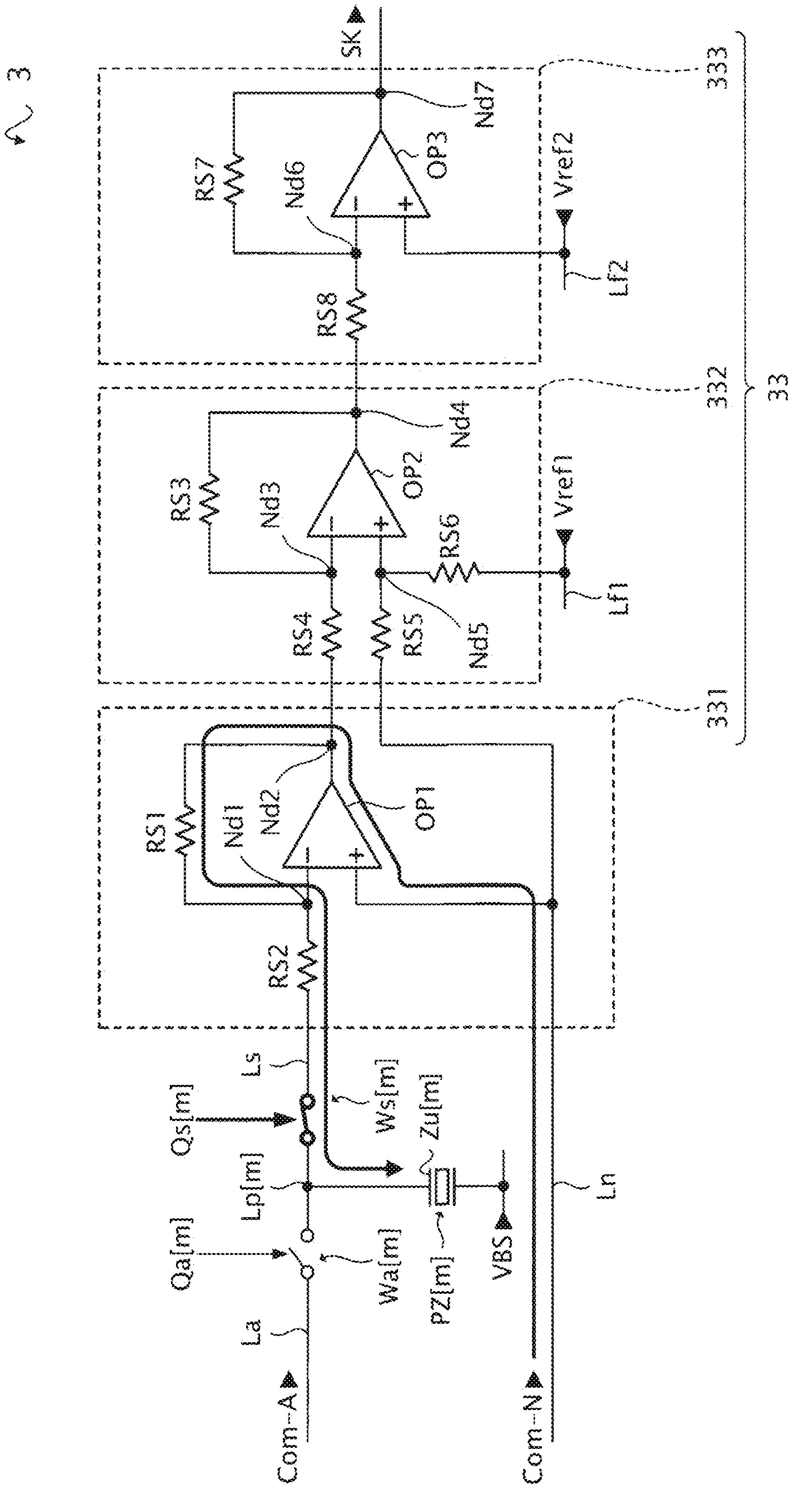
FIG. 10 is an explanatory diagram showing an example of an operation of the head unit 3.
Figure 11:
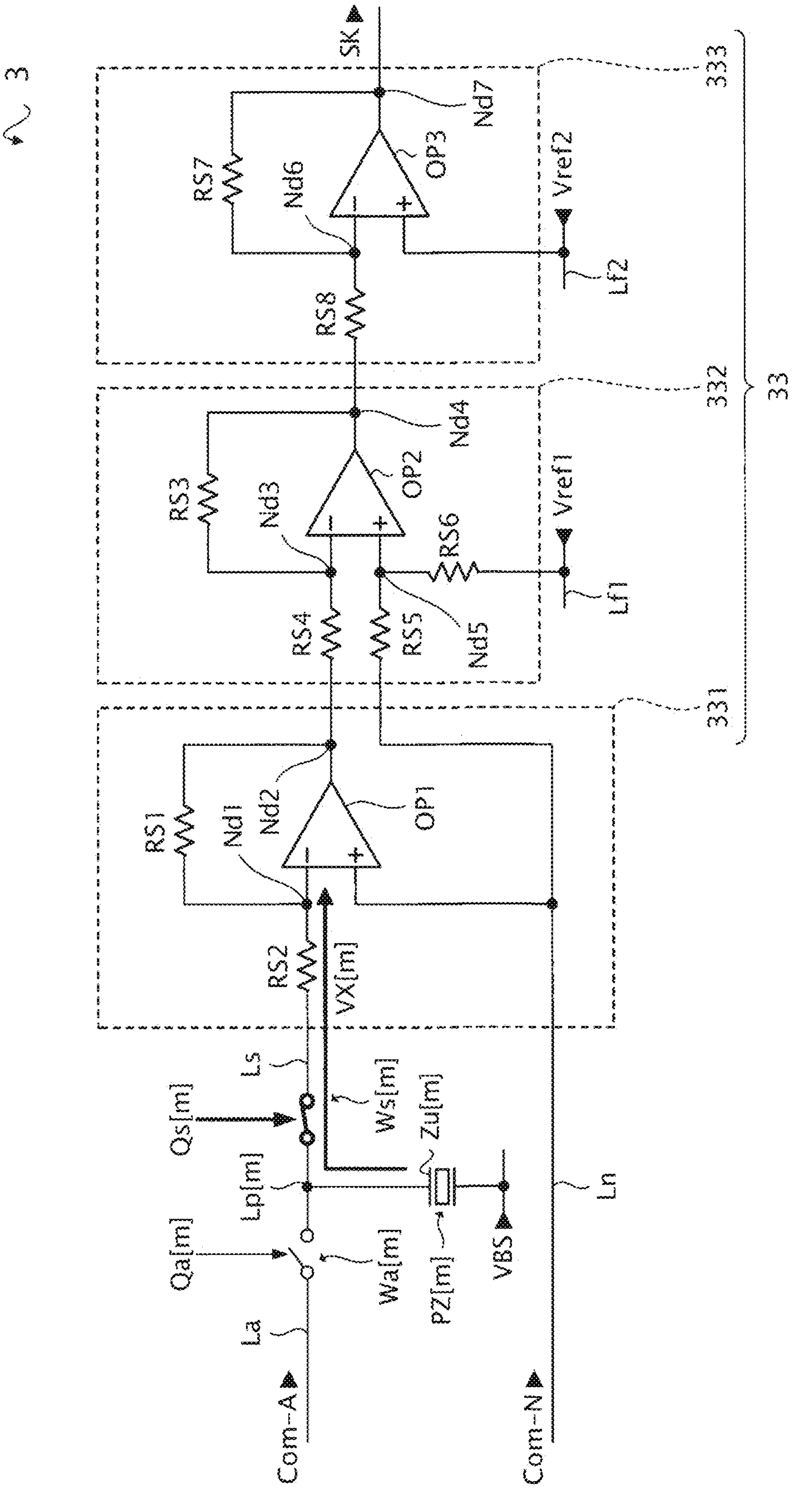
FIG. 11 is an explanatory diagram showing an example of the operation of the head unit 3.

FIGS. 10 and 11 show an example of the operation of the head unit 3 when the ejection state check processing for the ejection portion D[m] is executed.

As shown in FIG. 10, when the ejection state check processing for the ejection portion D[m] is executed, the coupling state designation signal Qs[m] becomes the high level and the switch Ws[m] is turned on. Accordingly, the check drive signal Com-N supplied to the wire Ln is supplied from the non-inverting input terminal of the operational amplifier OP2 to the upper electrode Zu[m] of the piezoelectric element PZ[m] via the output terminal of the operational amplifier OP2, the resistor RS1, the resistor RS2, the wire Ls, the switch Ws[m], and the wire Lp[m]. Thereby, the ejection portion D[m] is driven by the check drive signal Com-N1 having the element PN1 of the check drive signal Com-N and vibrates in the period TS1 of the unit period TP in which the ejection state check processing is executed for the ejection portion D[m].

As shown in FIG. 11, when the ejection state check processing for the ejection portion D[m] is executed, the switch Ws[m] is turned on, and the detection potential signal VX[m] indicating the potential of the upper electrode Zu[m] of the piezoelectric element PZ[m] is supplied from the upper electrode Zu[m] to the amplifier circuit 331 via the wire Lp[m], the switch Ws[m], and the wire Ls. The detection potential signal VX[m] supplied to the amplifier circuit 331 is amplified in the detection circuit 33, and then, output as the detection signal SK[m] from the amplifier circuit 333. Accordingly, the detection circuit 33 outputs the detection signal SK[m] having a waveform corresponding to the vibration remaining in the ejection portion D[m] in the period TS2 after the ejection portion D[m] is driven.

Figure 12:
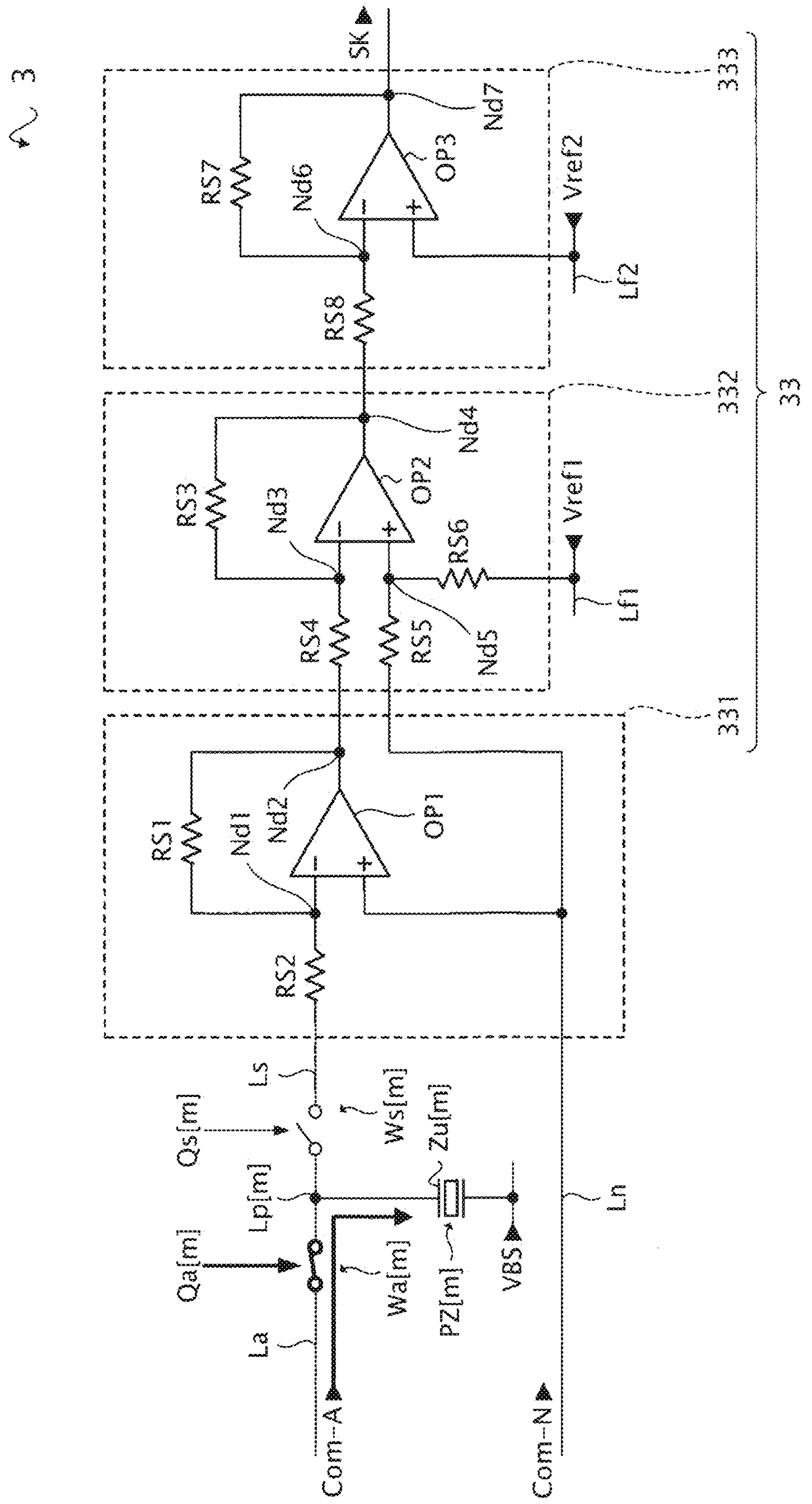
FIG. 12 is an explanatory diagram showing an example of the operation of the head unit 3.

FIG. 12 shows an example of the operation of the head unit 3 when the printing processing is performed and the ejection portion D[m] is driven as the print ejection portion DP.

As shown in FIG. 12, when the ejection portion D[m] is driven as the print ejection portion DP, the coupling state designation signal Qa[m] becomes the high level, and the switch Wa[m] is turned on. Accordingly, the printing drive signal Com-A supplied to the wire La is supplied from the wire La to the upper electrode Zu[m] of the piezoelectric element PZ[m] via the switch Wa[m] and the wire Lp[m]. Thereby, the ejection portion D[m] is driven as the print ejection portion DP to eject the ink.

5. Conclusion of Embodiment

As described above, the inkjet printer 1 according to the embodiment includes the ejection portion D[m] having the piezoelectric element PZ[m] driven by the drive signal Com, the cavity CV[m] filled with the ink and having the volume that changes according to the driving of the piezoelectric element PZ[m], and the nozzle N[m] ejecting the ink in the cavity CV[m] according to a change of the volume of the cavity CV[m], the wire Ln to which the check drive signal Com-N of the drive signal Com is supplied, the wire Lp[m] electrically coupled to the upper electrode Zu[m] of the piezoelectric element PZ[m], the detection circuit 33 detecting the potential of the upper electrode Zu[m] varying according to the vibration remaining in the piezoelectric element PZ[m] after the driving of the piezoelectric element PZ[m], and the check unit 5 determining the ejection state of the ink in the ejection portion D[m] based on the detection result of the detection circuit 33, wherein the detection circuit 33 includes the amplifier circuit 331, the amplifier circuit 331 has the operational amplifier OP1 having the inverting input terminal, the non-inverting input terminal, and the output terminal outputting the signal based on the input to the inverting input terminal and the input to the non-inverting input terminal, the resistor RS1 electrically coupling the node Nd1 electrically coupled to the inverting input terminal of the operational amplifier OP1 and the node Nd2 electrically coupled to the output terminal of the operational amplifier OP1, and the resistor RS2 electrically coupling the node Nd1 and the wire Lp[m], and the wire Ln is electrically coupled to the non-inverting input terminal of the operational amplifier OP1.

According to the embodiment, the check drive signal Com-N can be supplied to the piezoelectric element PZ[m] via the wire Ln, the operational amplifier OP1, the resistor RS1, the resistor RS2, and the wire Lp[m]. That is, according to the embodiment, both the supply of the check drive signal Com-N to the piezoelectric element PZ[m] and the acquisition of the detection potential signal VX[m] from the piezoelectric element PZ[m] can be executed in the path via the amplifier circuit 331. Therefore, according to the embodiment, it is not necessary to switch between continuity and discontinuity of the switch between the piezoelectric element PZ[m] and the detection circuit 33 as in a configuration in which the path for the supply of the check drive signal Com-N to the piezoelectric element PZ[m] and the path for the acquisition of the detection potential signal VX[m] from the piezoelectric element PZ[m] are different. Thus, according to the embodiment, the detection circuit 33 can accurately detect the potential of the upper electrode Zu[m] of the piezoelectric element PZ[m] as compared with the configuration in which the path for the supply of the check drive signal Com-N to the piezoelectric element PZ[m] and the path for the acquisition of the detection potential signal VX[m] from the piezoelectric element PZ[m] are different.

Further, the inkjet printer 1 according to the embodiment includes the switch Ws[m] switching continuity and discontinuity between the wire Lp[m] and the resistor RS2.

According to the embodiment, it is not necessary to switch continuity and discontinuity of the switch Ws[m] between the period for the supply of the check drive signal Com-N to the piezoelectric element PZ[m] and the period for the acquisition of the detection potential signal VX[m] from the piezoelectric element PZ[m]. Therefore, according to the embodiment, the detection circuit 33 can accurately detect the potential of the upper electrode Zu[m] of the piezoelectric element PZ[m] as compared with the configuration in which the path for the supply of the check drive signal Com-N to the piezoelectric element PZ[m] and the path for the acquisition of the detection potential signal VX[m] from the piezoelectric element PZ[m] are different.

In the inkjet printer 1 according to the embodiment, the check drive signal Com-N includes the check drive signal Com-N1 provided in the period TS1 of the unit period TP and having the element PN1 for driving the piezoelectric element PZ[m], and the check drive signal Com-N2 provided in the period TS2 of the unit period TP subsequent to the period TS1 and having the element PN2 maintaining the potential VN, and the switch Ws[m] maintains the ON state in the period TS1 and the period TS2.

According to the embodiment, the switching between continuity and discontinuity of the switch Ws[m] is not caused between the period TS1 in which the check drive signal Com-N is supplied to the piezoelectric element PZ[m] and the period TS2 in which the detection potential signal VX[m] is acquired from the piezoelectric element PZ[m]. Therefore, according to the embodiment, the detection circuit 33 can accurately detect the potential of the upper electrode Zu[m] of the piezoelectric element PZ[m] as compared with the configuration in which the path for the supply of the check drive signal Com-N to the piezoelectric element PZ[m] and the path for the acquisition of the detection potential signal VX[m] from the piezoelectric element PZ[m] are different.

In the inkjet printer 1 according to the embodiment, the amplifier circuit 331 does not include a switch element outside the operational amplifier OP1.

Therefore, according to the embodiment, the detection circuit 33 can accurately detect the potential of the upper electrode Zu[m] of the piezoelectric element PZ[m] as compared with a configuration in which the amplifier circuit 331 includes a switch element separately from the operational amplifier OP1.

In the inkjet printer 1 according to the embodiment, the detection circuit 33 includes the subtraction circuit 332, and the subtraction circuit 332 includes the operational amplifier OP2 having the inverting input terminal, the non-inverting input terminal, and the output terminal outputting the signal based on the input to the inverting input terminal and the input to the non-inverting input terminal, the resistor RS3 electrically coupling the node Nd3 electrically coupled to the inverting input terminal of the operational amplifier OP2 and the node Nd4 electrically coupled to the output terminal of the operational amplifier OP2, the resistor RS4 electrically coupling the node Nd2 and the node Nd3, the resistor RS5 electrically coupling the node Nd5 electrically coupled to the non-inverting input terminal of the operational amplifier OP2 and the wire Ln, and the resistor RS6 electrically coupling the node Nd5 and the feed line Lf1 set at the reference potential Vref1.

In the inkjet printer 1 according to the embodiment, the subtraction circuit 332 does not include a switch element outside the operational amplifier OP2.

Therefore, according to the embodiment, the detection circuit 33 can accurately detect the potential of the upper electrode Zu[m] of the piezoelectric element PZ[m] as compared with a configuration in which the subtraction circuit 332 includes a switch element separately from the operational amplifier OP2.

In the inkjet printer 1 according to the embodiment, the detection circuit 33 includes the amplifier circuit 333, and the amplifier circuit 333 includes the operational amplifier OP3 having the inverting input terminal, the non-inverting input terminal electrically coupled to the feed line Lf2 set at the reference potential Vref2, and the output terminal outputting the signal based on the input to the inverting input terminal and the input to the non-inverting input terminal, the resistor RS7 electrically coupling the node Nd6 electrically coupled to the inverting input terminal of the operational amplifier OP3 and the node Nd7 electrically coupled to the output terminal of the operational amplifier OP3, and the resistor RS8 electrically coupling the node Nd4 and the node Nd6.

In the inkjet printer 1 according to the embodiment, the amplifier circuit 333 does not include a switch element outside the operational amplifier OP3.

Therefore, according to the embodiment, the detection circuit 33 can accurately detect the potential of the upper electrode Zu[m] of the piezoelectric element PZ[m] as compared with a configuration in which the amplifier circuit 333 includes a switch element separately from the operational amplifier OP3.

In addition, the inkjet printer 1 according to the embodiment includes the wire La to which the printing drive signal Com-A of the drive signal Com is supplied and the switch Wa[m] switching continuity and discontinuity between the wire Lp[m] and the wire La, wherein the switch Wa[m] maintains the OFF state in the unit period TP in which the ejection portion D[m] is driven as the check object ejection portion DS, the switch Wa[m] maintains the ON state in the unit period TP in which the ejection portion D[m] is driven as the print ejection portion DP, and the switch Ws[m] maintains the OFF state in the unit period TP in which the ejection portion D[m] is driven as the print ejection portion DP.

B. Modifications

The above described embodiments can be variously modified. Specific modifications will be exemplified below. Two or more configurations freely selected from the following exemplifications may be appropriately combined in a range in which the configurations are mutually consistent. In the modifications exemplified below, elements having the same actions and functions as those of the embodiment have the same signs referred to in the above description, and the detailed description of the respective elements will be omitted as appropriate.

Modification 1

In the above described embodiment, the configuration in which the switch Wa[m] maintains the ON state in the entire unit period TP in which the ejection portion D[m] is driven as the print ejection portion DP, and the printing drive signal Com-A is supplied to the upper electrode Zu[m] in the entire unit period TP is described as an example, however, the present disclosure is not limited to the configuration.

For example, the switch Wa[m] may be turned on in a partial period of the unit period TP in which the ejection portion D[m] is driven as the print ejection portion DP, and the printing drive signal Com-A may be supplied to the upper electrode Zu[m] in the partial period.

Modification 2

In the above described embodiment and Modification 1, the case where the check unit 5 is provided separately from the head unit 3 is described as an example, however, the present disclosure is not limited to the configuration. The check unit 5 may be provided in the head unit 3. In this case, compared to a configuration in which the check unit 5 is provided outside the head unit 3, the chance that noise is mixed in the detection signal SK[m] supplied to the check unit 5 by the detection circuit 33 may be suppressed, and the accuracy of the check in the check unit 5 may be increased.

Modification 3

In the above described embodiment and Modifications 1 and 2, the case where the inkjet printer 1 includes the four head units 3 is assumed, however, the present disclosure is not limited to the configuration. The inkjet printer 1 may include one to three head units 3, or may include five or more head units 3. In the above described embodiment and Modifications 1 and 2, the case where the inkjet printer 1 includes the four check units 5 is assumed, however, the present disclosure is not limited to the configuration. The inkjet printer 1 may include one or more check units 5. For example, the inkjet printer 1 may include more check units 5 than the head units 3, or may include fewer check units 5 than the head units 3.

Modification 4

In the above described embodiment and Modifications 1 to 3, the case where the inkjet printer 1 is a serial printer is exemplified, however, the present disclosure is not limited to the configuration. The inkjet printer 1 may be a so-called line printer in which a plurality of nozzles N[1] to N[M] are provided to extend to be wider than the width of the recording paper PP in the head unit 3.

What is claimed is:

1. A liquid ejection apparatus comprising:

an ejection portion including a piezoelectric element driven by a drive signal, a pressure chamber filled with a liquid and having a volume that changes according to driving of the piezoelectric element, and a nozzle ejecting the liquid in the pressure chamber according to a change of the volume of the pressure chamber;

a first wire to which a first drive signal of the drive signal is supplied;

a second wire electrically coupled to an element electrode of the piezoelectric element;

a detection circuit detecting a potential of the element electrode varying according to a vibration remaining in the piezoelectric element after the driving of the piezoelectric element; and a check device checking an ejection state of the liquid in the ejection portion based on a detection result of the detection circuit, wherein the detection circuit includes a first amplifier circuit, and the first amplifier circuit includes a first amplifier having a first input terminal, a second input terminal, and a first output terminal outputting a signal based on input to the first input terminal and input to the second input terminal, a first resistor electrically coupling a first node electrically coupled to the first input terminal and a second node electrically coupled to the first output terminal, and a second resistor electrically coupling the first node and the second wire, and the first wire is electrically coupled to the second input terminal.

2. The liquid ejection apparatus according to claim 1, further comprising a first switch switching continuity and discontinuity between the second wire and the second resistor.

3. The liquid ejection apparatus according to claim 2, wherein the first drive signal includes a first check signal provided in a first check period of a check period and having a first check waveform for driving the piezoelectric element, and a second check signal provided in a second check period of the check period subsequent to the first check period and maintains a constant detection potential, and the first switch maintains an ON state in the first check period and the second check period.

4. The liquid ejection apparatus according to claim 3, further comprising:

a third wire to which a second drive signal of the drive signal is supplied; and a second switch switching continuity and discontinuity between the second wire and the third wire, wherein the second switch maintains an OFF state in the check period, the second switch maintains an ON state in a part or all of a print period different from the check period, and the first switch maintains an OFF state in the print period.

5. The liquid ejection apparatus according to claim 1, wherein the first amplifier circuit does not include a switch element outside the first amplifier.

6. The liquid ejection apparatus according to claim 1, wherein the detection circuit includes a subtraction circuit, and the subtraction circuit includes a second amplifier having a third input terminal, a fourth input terminal, and a second output terminal outputting a signal based on input to the third input terminal and input to the fourth input terminal, a third resistor electrically coupling a third node electrically coupled to the third input terminal and a fourth node electrically coupled to the second output terminal, a fourth resistor electrically coupling the second node and the third node, a fifth resistor electrically coupling a fifth node electrically coupled to the fourth input terminal and the first wire, and a sixth resistor electrically coupling the fifth node and a first feed line set at a first reference potential.

7. The liquid ejection apparatus according to claim 6, wherein the subtraction circuit does not include a switch element outside the second amplifier.

8. The liquid ejection apparatus according to claim 6, wherein the detection circuit includes a second amplifier circuit, and the second amplifier circuit includes a third amplifier having a fifth input terminal, a sixth input terminal electrically coupled to a second feed line set at a second reference potential, and a third output terminal outputting a signal based on input to the fifth input terminal and input to the sixth input terminal, a seventh resistor electrically coupling a sixth node electrically coupled to the fifth input terminal and a seventh node electrically coupled to the third output terminal, and an eighth resistor electrically coupling the fourth node and the sixth node.

9. The liquid ejection apparatus according to claim 8, wherein the second amplifier circuit does not include a switch element outside the third amplifier.

10. A liquid ejection head comprising:

a piezoelectric element driven by a drive signal;

a pressure chamber filled with a liquid and having a volume that changes according to driving of the piezoelectric element;

a nozzle ejecting the liquid in the pressure chamber according to a change of the volume of the pressure chamber;

a first wire to which a first drive signal of the drive signal is supplied;

a second wire electrically coupled to an element electrode of the piezoelectric element; and a detection circuit detecting a potential of the element electrode varying according to a vibration remaining in the piezoelectric element after the driving of the piezoelectric element, wherein the detection circuit includes a first amplifier circuit, the first amplifier circuit includes a first amplifier having a first input terminal, a second input terminal, and a first output terminal outputting a signal based on input to the first input terminal and input to the second input terminal, a first resistor electrically coupling a first node electrically coupled to the first input terminal and a second node electrically coupled to the first output terminal, and a second resistor electrically coupling the first node and the second wire, and the first wire is electrically coupled to the second input terminal.

11. The liquid ejection head according to claim 10, further comprising a first switch switching continuity and discontinuity between the second wire and the second resistor.

12. The liquid ejection head according to claim 11, wherein the first drive signal includes a first check signal provided in a first check period of a check period and having a first check waveform for driving the piezoelectric element, and a second check signal provided in a second check period of the check period subsequent to the first check period and maintains a constant detection potential, and the first switch maintains an ON state in the first check period and the second check period.

13. The liquid ejection head according to claim 12, further comprising:

a third wire to which a second drive signal of the drive signal is supplied; and a second switch switching continuity and discontinuity between the second wire and the third wire, wherein the second switch maintains an OFF state in the check period, the second switch maintains an ON state in a part or all of a print period different from the check period, and the first switch maintains an OFF state in the print period.

14. The liquid ejection head according to claim 10, wherein the first amplifier circuit does not include a switch element outside the first amplifier.

15. The liquid ejection head according to claim 10, wherein the detection circuit includes a subtraction circuit, and the subtraction circuit includes a second amplifier having a third input terminal, a fourth input terminal, and a second output terminal outputting a signal based on input to the third input terminal and input to the fourth input terminal, a third resistor electrically coupling a third node electrically coupled to the third input terminal and a fourth node electrically coupled to the second output terminal, a fourth resistor electrically coupling the second node and the third node, a fifth resistor electrically coupling a fifth node electrically coupled to the fourth input terminal and the first wire, and a sixth resistor electrically coupling the fifth node and a first feed line set at a first reference potential.

16. The liquid ejection head according to claim 15, wherein the subtraction circuit does not include a switch element outside the second amplifier.

17. The liquid ejection head according to claim 15, wherein the detection circuit includes a second amplifier circuit, and the second amplifier circuit includes a third amplifier having a fifth input terminal, a sixth input terminal electrically coupled to a second feed line set at a second reference potential, and a third output terminal outputting a signal based on input to the fifth input terminal and input to the sixth input terminal, a seventh resistor electrically coupling a sixth node electrically coupled to the fifth input terminal and a seventh node electrically coupled to the third output terminal, and an eighth resistor electrically coupling the fourth node and the sixth node.

18. The liquid ejection head according to claim 17, wherein the second amplifier circuit does not include a switch element outside the third amplifier.

* * * * *